United States Patent
Yannone

(10) Patent No.: US 7,764,217 B2
(45) Date of Patent: Jul. 27, 2010

(54) SURFACE RF EMITTER PASSIVE RANGING ACCURACY CONFIRMATION ALGORITHM

(75) Inventor: Ronald M. Yannone, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 520 days.

(21) Appl. No.: 11/919,192

(22) PCT Filed: Oct. 13, 2006

(86) PCT No.: PCT/US2006/040125

§ 371 (c)(1),
(2), (4) Date: Oct. 23, 2007

(87) PCT Pub. No.: WO2008/051204

PCT Pub. Date: May 2, 2008

(65) Prior Publication Data

US 2009/0310664 A1      Dec. 17, 2009

Related U.S. Application Data

(60) Provisional application No. 60/726,421, filed on Oct. 13, 2005.

(51) Int. Cl.
G01S 13/42 (2006.01)
H04B 1/10 (2006.01)
H04B 17/00 (2006.01)

(52) U.S. Cl. ............ 342/13; 342/126; 342/133; 342/139; 342/140; 342/146; 342/147; 342/417; 342/463; 375/228; 375/350

(58) Field of Classification Search .......... 342/13, 342/90–92, 95–97, 126, 133, 139–140, 146–147, 342/417, 463; 375/228, 350
See application file for complete search history.

(56) References Cited

U.S. PATENT DOCUMENTS

| 5,343,212 | A  | * | 8/1994  | Rose et al. ........... 342/424 |
| 5,406,291 | A  | * | 4/1995  | Guerci et al. ........ 342/451 |
| 5,526,001 | A  | * | 6/1996  | Rose et al. ........... 342/442 |
| 6,266,014 | B1 | * | 7/2001  | Fattouche et al. ..... 342/450 |
| 6,525,685 | B1 | * | 2/2003  | Rose ................... 342/148 |
| 6,639,553 | B2 | * | 10/2003 | Lin et al. ............. 342/444 |
| 6,714,155 | B1 | * | 3/2004  | Rose ................... 342/107 |
| 7,579,989 | B2 | * | 8/2009  | Winterling et al. .... 342/450 |
| 7,626,538 | B2 | * | 12/2009 | Rose ................... 342/195 |
| 2005/0052315 | A1 | * | 3/2005 | Winterling et al. .... 342/126 |
| 2009/0310664 | A1 | * | 12/2009 | Yannone ............... 375/228 |

FOREIGN PATENT DOCUMENTS

WO    WO 2006135416 A2 * 12/2006

OTHER PUBLICATIONS

"Estimation of range and bearing of RF emitters using direction-of-arrival data", Wasylkiwskyj, W.; Electronics in Marine, 2004. Proceedings Elmar 2004. 46th International Symposium Digital Object Identifier: 10.1109/ELMAR.2004.1356349 Publication Year: 2004, pp. 22-29.*

* cited by examiner

Primary Examiner—John B Sotomayor
(74) Attorney, Agent, or Firm—Daniel J. Long

(57) ABSTRACT

Kalman gain is used to calculate range accuracy for a passive angle-of-arrival determining systems, most notably for short-baseline interferometry, in which Kalman gain after arriving at a minimum proceeds to within a predetermined fraction or percent of zero gain, at which time the range estimate accuracy is known.

17 Claims, 3 Drawing Sheets

SURFACE RF EMITTER PASSIVE RANGING ACCURACY CONFIRMATION ALGORITHM

RELATED APPLICATIONS

This Application claims rights under 35 USC §119(e) from U.S. Provisional Application Ser. No. 60/726,421 filed Oct. 13, 2005, the contents of which are incorporated herein by reference.

STATEMENT OF GOVERNMENT INTEREST

The invention was made with United States Government support under Contract No. N00019-02-C-3002. The United States Government has certain rights in this invention.

FIELD OF THE INVENTION

This invention relates to electronic warfare and more particularly to algorithms for use in electronic warfare for validating range estimates.

BACKGROUND OF THE INVENTION

For decades, the defense business has been plagued by not having a reliable, deterministic method to know when the Kalman filter solution for passive ranging application is reliable for use by the fighter pilot. This has made it hard to accurately assess when the ranging solution can be used for situation awareness and weapons use. To date, ad hoc rules-of-thumb have been used to assess when the estimate of the Kalman filter standard deviation on range is thought to be reliable.

The use of passive sensor angle measurements to compute the location of surface and airborne radio frequency (RF) emitters or targets for low observable fighter aircraft is vital to ensure mission success and pilot survivability. The onboard electronic warfare sensor suite consists of multiple short baseline interferometers, SBI, that detect the radar emissions from the emitters in the battle space. The angle measurement accuracy is a function of emitter frequency, emitter angle-off-array-boresight, SBI array length, the signal-to-noise ratio, the number of RF pulses processed by the EW system, and overall array phase error. The SBI parameters consequently yield different 1-sigma values over time. Because the EW system has no control over the emitters, the measurements can arrive either synchronously or asynchronously. The sensor may also be on unmanned aerial vehicles, fast-moving surface and sub-surface vessels, or helicopters.

By way of example, a fighter aircraft flies straight-and-level with pre-planned, coordinated heading changes at waypoints in the mission. In the course of a mission, the pilot will encounter unexpected pop-up surface or airborne emitters that he needs to either avoid or respond to quickly. Pilot responses may include the use of defensive or offensive weapons, or a simple change in aircraft orientation with respect to the emitter. In both cases, the electronic warfare system processes SBI measurements. Sometimes the electronic warfare system will be able to regulate the measurement update rate, and this can assist convergence in the passive ranging solution.

Thus, for many years, in passive ranging applications the location of an emitter, be it an RF, infrared or acoustic emitter, has been determined with geolocation techniques utilized in an electronic warfare tracker in which the range and bearing to a particular emitter is ascertained. The perennial problem is that one cannot determine the reliability of the range estimate, although various methods of predicting range error have been used.

Chief in these predictive methods is the use of sigma-range derived from the updated state vector error covariance matrix associated with a Kalman filter. In general the sigma value is supposed to specify the reliability of the range measurement.

Whether it is a system using long-baseline interferometry or other systems for ascertaining angle of arrival of radiation from a target, the Kalman filter takes the noisy sensor angle measurements and in an iterative process refines or smoothes the noisy measurements and produces a derived range estimate. The result is a one-over-square-root improvement in the angle measurement error and a consequent improvement in range estimate.

However, the quality or trueness of the range estimate is unknown.

Over the many years, investigators have used an updated state vector error covariance matrix derivable from the Kalman filter to estimate the range sigma value for the range estimates produced by the filter. The Kalman filter estimates the 3-state vector and converts to range by computing the square root of the sum of the squares of the state variables.

Using the latest state vector and the updated state vector error covariance matrix, the Kalman filter generates an estimate of the quality of the range estimate in terms of the one-sigma range value.

For instance, assuming that one has a detectable target at 100 miles from a platform, and further assuming a one-sigma range uncertainty of 5 miles, then at the platform at which the geolocation sensor is located, one knows that the target is within plus or minus 5 miles around the 100-mile measured value. This gives an approximate 68% confidence level in the estimated range. If one uses a two-sigma value, then one is 95% confident of the range estimate falling between 90 and 110 miles about the range estimate.

The problem historically has been that over the years no one has come up with appropriate correction factors to multiply the value of sigma by so that range quality can be reliably ascertained. Many different rules of thumb have been tried without success.

In short, when using the Kalman filter to passively estimate range to a stationary target, there is no way of ascertaining the veracity of the tracking quality.

In the past, in order to improve the sigma range value, when a particular measurement has been made given known coordinates and parameters, one can establish a tailored multiplier or weighting scheme for the one-sigma value. However, this weighting scheme is only valid for that particular scenario. Whether or not the particular weighting scheme is applicable to other scenario circumstances is never known. Unfortunately the weighting scheme can either be optimistic, meaning that it gives a confidence level that is too high for the range measurement, or it could be much too pessimistic. One never knows whether the weighting scheme for the one-sigma range value is appropriately set by simply observing the noisy angle measurements that are processed.

One would very much like to be able to establish a confidence level that, for instance, for 95% of the time, the range measurement is within 10% of the true range, or "truth."

In summary, even with the best weighting schemes for the one-sigma range value, this value is oftentimes too erroneous. The one-sigma range value as weighted with tailored weights is oftentimes more predictable from a theoretical viewpoint when, for instance, the platform is an aircraft flying along a straight path over a surveilled area. Given such a scenario, one can adapt the weighting scheme to make the sigma prediction correspond to reality.

On the other hand, if the aircraft is executing high G turns or has a path that is non-linear, then the so-called fudge factors that multiply the one-sigma value can, for instance, indicate that a measured range is within 10% of truth when in fact it is only within 30% of truth.

Thus in the past and historically, what investigators do is to generate a specially tailored multiplier for the sigma range value that comes out of the Kalman filter in the hope that the altered sigma metric corresponds to some sense of truth. However, in the prior attempts at generating appropriate multipliers for sigma range values, one does not know whether one has improved the situation. It has sometimes been said that anybody's guess for sigma is as good as anyone else's.

The result is that utilizing sigma range as a way of looking at range accuracy is unreliable.

By way of further background, the way that one traditionally computes the percent range error, PRE, is simply to multiply the absolute value of the difference between the true range and the range estimate by 100, then divided by the true range. One then wants to make sure that the percent range error reduces to an acceptable region, for instance 10% or any intermediate value useful to the pilot and the onboard Mission Systems planning software. The reason that the sigma range value does not accurately indicate what the range error is, is that the sigma value could either be too pessimistic, i.e., higher than what it really should have been, or it could be too pessimistic. Either way, if one cannot trust one's range estimates to be accurate to, say, within 10%, one cannot derive a particular battlefield advantage.

It will be appreciated that passively ranging against any kind of target of interest utilizes primarily azimuth-only measurements. These azimuth-only measurements are used to compute range, with the range-sensing equipment being located, for instance, on aircraft, high-speed boats patrolling a harbor or coastal region, for instance, for homeland security, helicopters and surveillance aircraft such as E2C, Hawkeye, AWACS and UAVs or unmanned aerial vehicles. All of these platforms carry sensors that can measure angle to the different targets of interest, which can be processed to estimate range. The key question is how does one trust the range estimate out of the angle of arrival algorithms used on such platforms.

If one can establish that the range error is, for instance, 10%, one could accurately launch missiles, drop air-to-ground bombs, or in general deploy any type of countermeasure for which knowing the geolocation of the target is important. These geopositioning sensors, which utilize angle of arrival, are used not only to ascertain the geolocation of the target, but also motion as well.

SUMMARY OF INVENTION

Rather than generating sigma range values, in the subject invention one simply observes the Kalman filter gain in the X and Y directions and uses this to establish the range estimation quality.

It is noted that the Kalman filter uses an iterative process in which the filter generates weights that are applied to what is called the angle measurement residual, which is the measurement value minus the filter's estimate. It is Kalman gain, K, which weights the difference between the measured value and the filter's estimate. The weights are iteratively applied so that this difference between the measurement and the filter's estimate is reduced. When the measured value minus the filter's estimate is zero, then the range estimate is perfect. This is indicated when the Kalman gain, K, goes to zero.

In the subject application, the angle residual is the Kalman filter's estimate of the expected new angle measurement minus the sensor's angle measurement.

Rather than using the updated state vector error covariance matrix and the companion updated state vector to compute sigma range, one looks at the Kalman gain matrix, which has three elements. It is a vector having an X component, a Y component and a Z component. Because Z or the vertical direction does not vary and is more or less constant because the sensing platform altitude is known accurately and is small compared to the slant range to the target, the z-component's contribution can be ignored.

One therefore observes the azimuthal Kalman gain components, namely $K_X$ and $K_Y$.

During the mission in which one wishes to establish the geolocation of an emitter, the $K_X$ Kalman gain and the $K_Y$ Kalman gain proceed to a minimum in which either the $K_X$ minimum or the $K_Y$ minimum will be deeper, i.e., larger in the absolute value sense.

In the subject system, in one embodiment, one selects the $K_X$ or $K_Y$ that exhibits the deeper minimum and then looks to see when that $K_X$ or $K_Y$ reaches approximately zero or settles out. By settling out is meant that the value of the Kalman gain proceeds from a large minimum, called a "null," corresponding to poor range accuracy to asymptotically approach zero when the Kalman filter is said to "settle."

If one had an extended period of time, one could wait until the Kalman filter gains reached zero. However, if one chooses to wait only until the minimum rises to within, for instance, one-sixteenth of the depth of the minimum, then one could rapidly establish the quality of the range measurement, for instance that the range accuracy is 10%.

Using the measured value of the change in the gain matrix of the Kalman filter, one can in a deterministic way reliably establish the accuracy of the range estimate without resorting to sigma range values and specifically tailored multipliers or unreliable "fudge factors."

Thus, in one embodiment, as a rule of thumb, when the Kalman gain in either the X or Y direction settles out to between one-twelfth and one-sixteenth of the minimum, then the range estimate is determined to be 90% accurate, or has a range error less than 10%. What this means is that the system waits to see that the Kalman gain comes up from its minimum to close to zero. When one observes Kalman gain settle to one-sixteenth of the minimum, then one knows that the range estimate out of the Kalman filter is within about 10% of truth, namely the true range.

One need no longer look at the sigma range calculation from the Kalman filter per se with its 30 years of fudge factors.

Thus, by looking at Kalman gain elements alone, one has a much better measure of the confidence of the measured range.

Observing the Kalman gain elements is simple as it is a direct output of the Kalman filter. Moreover, it does not take an engineer to establish what the gain is, merely that the gain is to be monitored. When the gain in either the X or Y direction is back to approximately zero, then the range estimate is close to 100% accurate.

In short, one determines the minima for both $K_X$ and $K_Y$ and thereafter determines for the deeper of the minima when the gain in that particular direction settles out. When the gain settles out, the smoothing associated with the Kalman filter is complete and the range estimate is within very tight tolerances.

It is interesting that this particular calculation completely eliminates the necessity of even considering sigma range, the traditional way of quantifying a range accuracy. It also completely eliminates all of the fudge factor calculations that have been used to adjust the sigma range values. It completely eliminates using the update state vector error covariance matrix and its companion updated state vector to estimate range quality. In short, the subject system eliminates the utilization of sigma range altogether, which is a relatively inaccurate measure of the quality of the estimated range.

In summary, Kalman gain is used to calculate range accuracy for a passive angle-of-arrival determining systems, most notably for short-baseline interferometry, in which Kalman gain after arriving at a minimum proceeds to within a predetermined fraction or percent of zero gain, at which time the range estimate accuracy is known.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
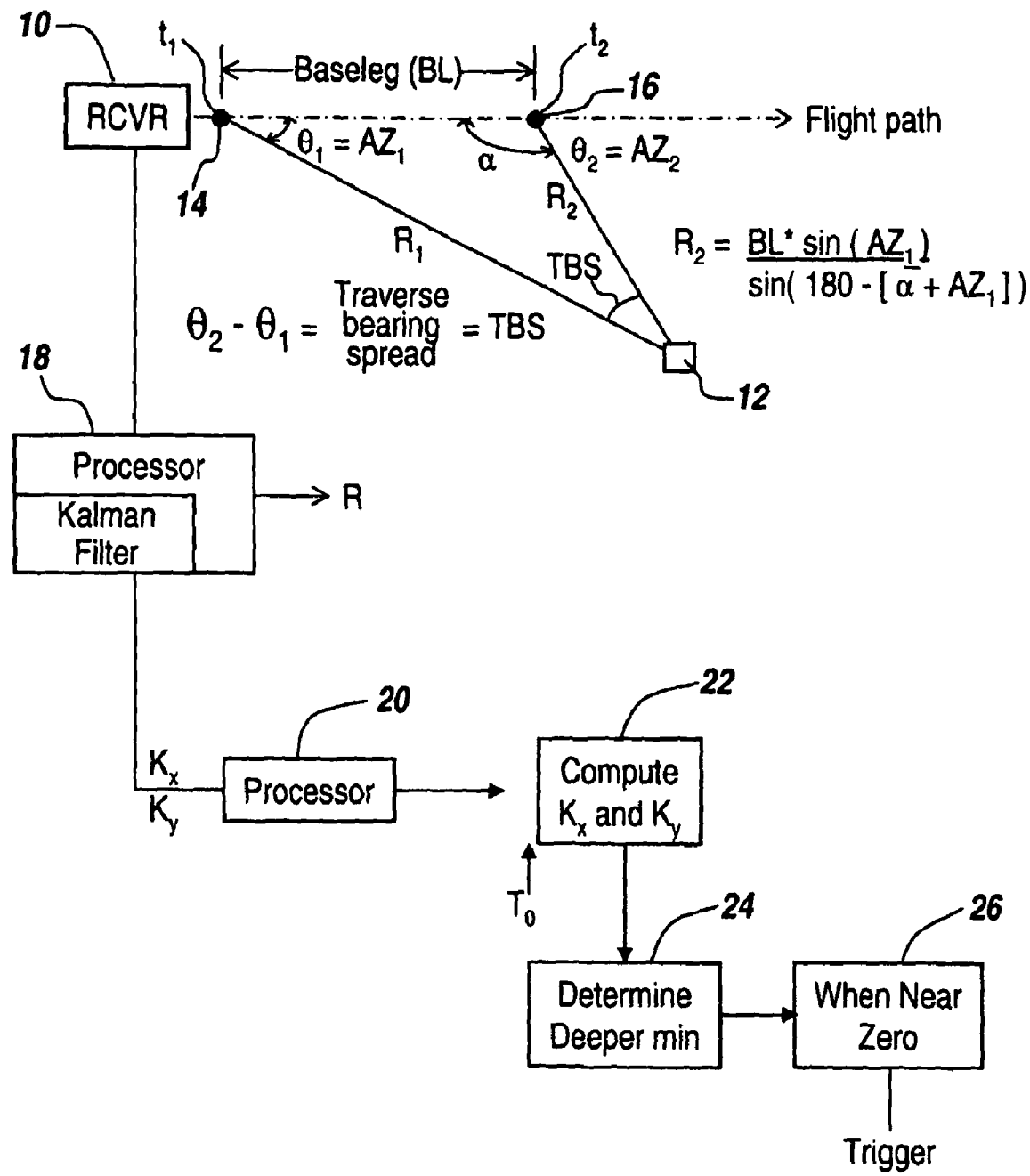
FIG. 1 is a diagrammatic illustration of range measurements derived from traverse bearing spread in which the measurements are applied to a processor having a Kalman filter, in which the Kalman filter gain is sensed, with a minimum detected followed by a settling of the gain value to within a certain fraction of the minimum to establish range estimate accuracy.

Referring now to FIG. 1, in a typical passive interferometric angle-of-arrival measurement system, a receiver 10 receives emissions from an emitter 12, which may be a target. The receiver is connected to two spaced-apart antennas 14 and 16, the spacing constituting the base leg, BL.

The receiver is connected to a processor for calculating range to emitter 12. This processor 18 includes a Kalman filter having as an output $K_X$ and $K_Y$, which are coupled to a Kalman gain determining processor 20 that determines the Kalman gains associated with the Kalman filter processing. The Kalman gains are coupled to a unit 22 that in essence makes a plot of Kalman gain versus time. The Kalman gains along with the timeline are coupled to a unit 24 that determines which of the two Kalman gains, $K_X$ or $K_Y$, has the deeper minimum. Having determined which of the two Kalman gains has the deeper minimum, unit 26 is utilized to determine when, after a minimum, the selected Kalman gain is within a predetermined fraction or percentage of zero.

When the selected Kalman gain $K_X$ or $K_Y$ is within a predetermined fraction or percentage of zero, a trigger is initiated to indicate that the range estimate from processor 18 is valid to a predetermined accuracy, in one embodiment 10%.

When the trigger is emitted from unit 26, the percent range error of range R from processor 18 is within the predetermined range error.

Note that processor 18 computes the range R based on the transverse bearing spread, TBS, which is the absolute difference between the true range and the range estimate multiplied by 100, then divided by the true range.

The following equations indicate the range calculation that is made by processor 18, noting that transverse bearing spread is used.

Here it can be seen that the measured sensor angles are $AZ_1$ and $AZ_2$ at times $t_1$ and $t_2$ along the flight path. The plane carrying antennas 14 and 16 travels a known distance via the onboard inertial navigation system, called the Baseleg (BL). The angle $\alpha$ is the "supplementary angle" to $AZ_2$ and equals $\alpha=180-AZ_2$. The angle $\beta$ equals 180 minus the sum of the interior angles in the triangle, and so $\beta=180-[\alpha+AZ_1]$. Applying the law of sines to include the desired parameter $R_2$, one has the following expression.

$$\frac{BL}{\sin(180-[\alpha+AZ_1])} = \frac{R_2}{\sin(AZ_1)} \qquad \text{Eqn. (1)}$$

Solving Eqn.(1) for $R_2$, one obtains:

$$R_2 = \frac{BL * \sin(AZ_1)}{\sin(180-[\alpha+AZ_1])} \qquad \text{Eqn. (2)}$$

Figure 2:
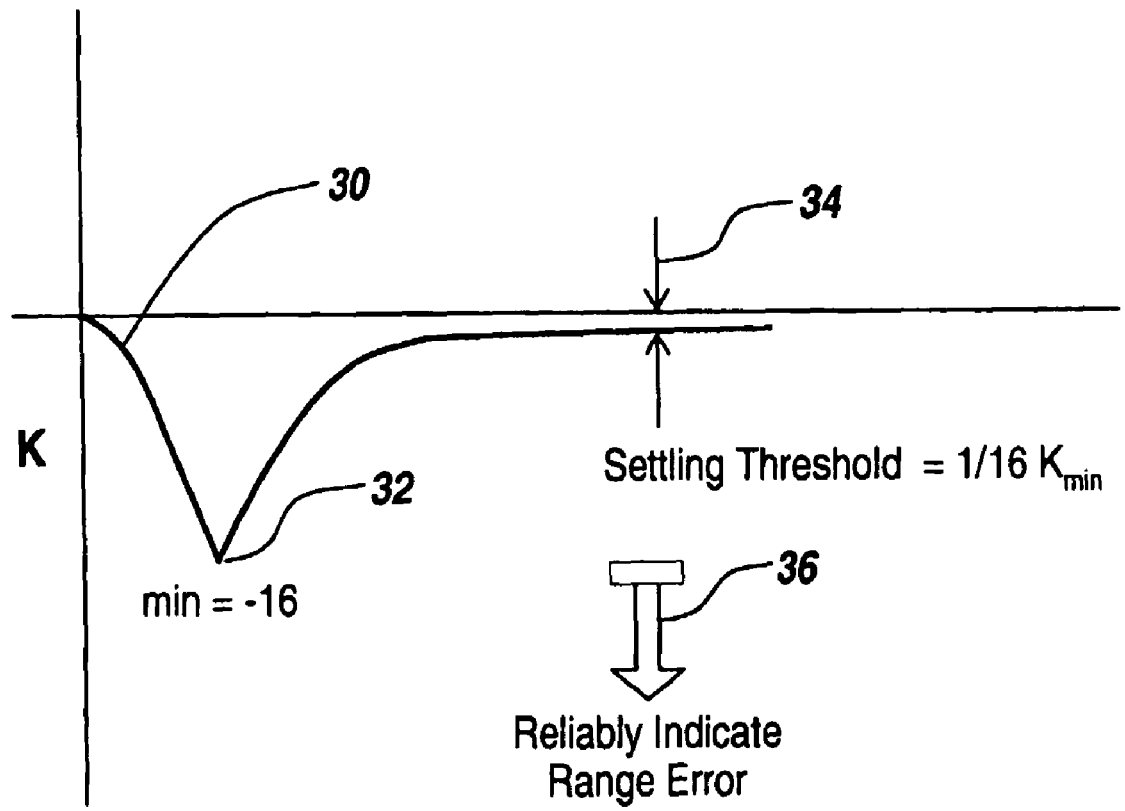
FIG. 2 is a graph showing the minima and settling of the gain, K, of the Kalman filter, indicating when the Kalman filter gain has settled, range error is low and reliable.

Referring to FIG. 2, what can be seen in this Kalman filter gain is that the Kalman gain 30 reaches a minimum 32 and then approaches zero, such as indicated by double-ended arrow 34. Assuming that the Kalman gain minimum is at −16, then the threshold set by unit 36 of FIG. 1 is set to be equal to $\frac{1}{16}^{th}$ of $K_{min}$. At this point the trigger signal emitted by unit 26 of FIG. 1 indicated by arrow 36 establishes that the range estimate R from processor 18 of FIG. 1 is within a prescribed range error.

Figure 4:
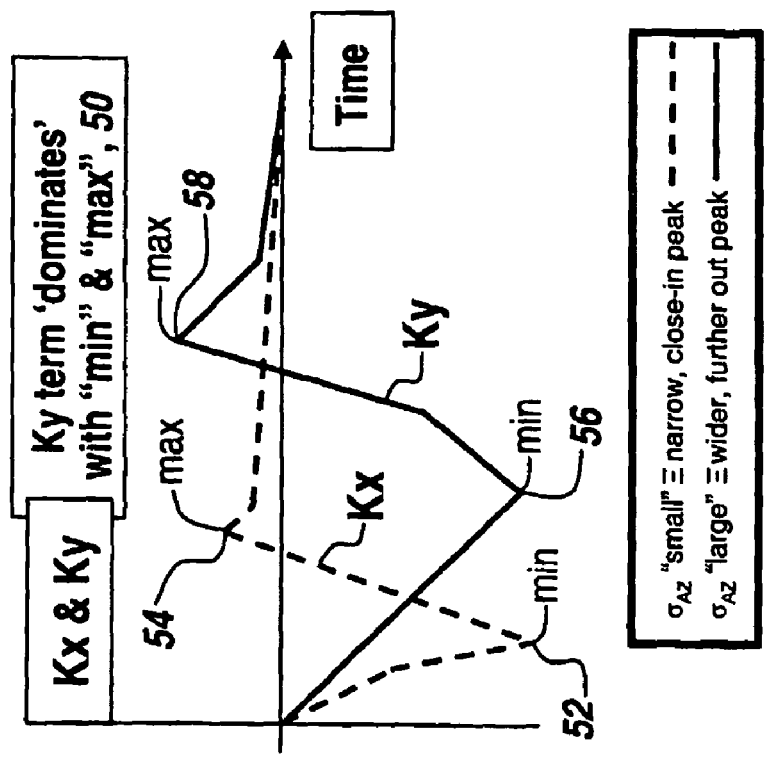
Figure 3:
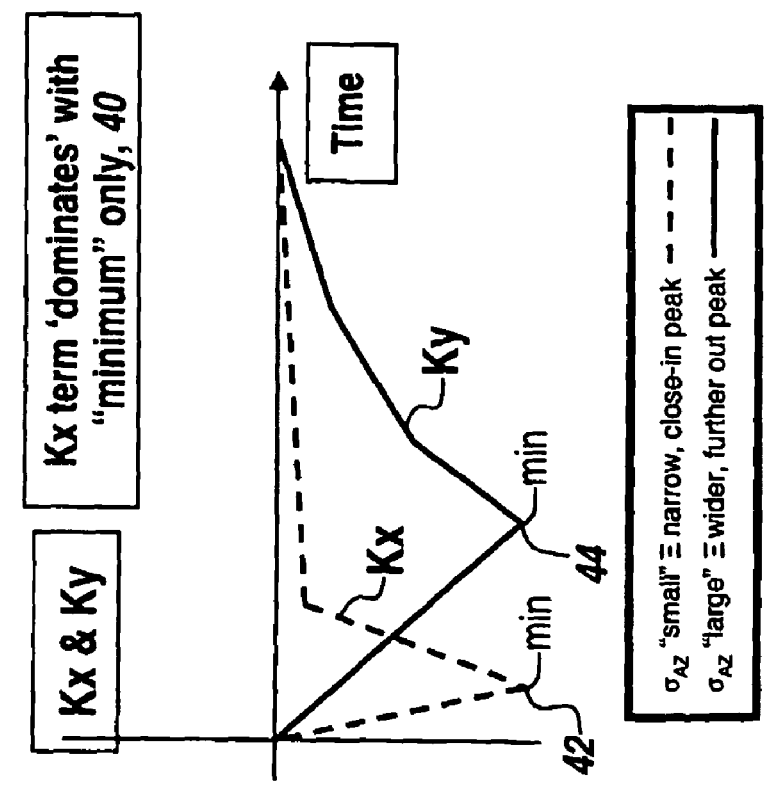
FIG. 3 is a graph showing Kalman filter gain in which the $K_X$ term dominates; and, FIG. 4 is a graph showing the Kalman filter gains in which the $K_Y$ term dominates, $K_X$ and $K_Y$ gain having both a minimum and a maximum.

Referring to FIGS. 3 and 4, these figures show only one Extended Kalman Filter, EKF, gain matrix element to keep figure uncluttered. Both $K_X$ and $K_Y$ tend to "follow" each other. FIG. 3 shows by graphs 40 that when the emitter is more down-range and closer to the flight path, the $K_X$ term 44 "dominates" over the $K_Y$ term 42. FIG. 4 shows by graphs 50 when the emitter is more cross-range and closer to the right wing of the aircraft, i.e., near the point-of-closest-approach, PCA, the $K_Y$ term 56 "dominates" over the $K_X$ term 52. Here both $K_X$ and $K_Y$ go through a minimum 52 and 56 and then to a maximum 54 and 58, the amplitude being a function of the sensor measurement accuracy for azimuth.

Source code used in a preferred embodiment of the present invention is shown in Appendix "A."

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a system for passively determining range to an emitter in which angle-of-arrival measurements are made along a baseline and in which a Kalman filter is used in a range-determining element to smooth the range estimates output therefrom, a method for determining the reliability of the range estimates, comprising the steps of:

computing the Kalman gain for the Kalman filter in the range-determining element;

ascertaining when over time a minimum occurs in the Kalman gain; and, detecting when after the minimum the Kalman gain is within a predetermined distance of zero, thus to establish that the range estimate at the time that the Kalman gain settles to within the predetermined distance is reliable.

2. The system of claim 1, wherein Kalman gain is determined in two orthogonal directions and wherein the Kalman gain having the deepest minimum is selected for determining when, after a minimum has been detected, the selected Kalman gain is within the predetermined distance.

3. The system of claim 1, wherein the predetermine distance is a fraction of the absolute value of the minimum.

4. The system of claim 3, wherein the fraction is between $1/12^{th}$ and $1/16^{th}$.

5. The system of claim 1, wherein the predetermined distance is set so as to assure that the percent range error is 10% at the time that the Kalman gain settles.

6. The system of claim 1, wherein the Kalman gain has both a minima and a maxima and wherein the time at which the predetermined distance is measured occurs after the time of the occurrence of the maxima.

7. A method for eliminating the uncertainty associated with measuring the reliability of a range estimate using sigma range derived from the co-variance matrix of a Kalman filter used in a passive ranging system, comprising the step of:

ignoring the sigma range in favor of determining the reliability of the range estimate from a range-determining element employing the Kalman filter by detecting when the Kalman gain settles out after having first exhibited a minimum.

8. The method of claim 7, wherein the percent range error from the range-determining element is determined to be reliable when the Kalman gain settles out to within a predetermined fraction of the absolute value of the minimum.

9. The method of claim 8, wherein the Kalman gain settles out when the Kalman gain is between $1/12^{th}$ and $1/16^{th}$ of the absolute value of the minimum.

10. The method of claim 8, wherein when the Kalman gain settles out the percent range error is reliable to within a predetermined percentage.

11. The method of claim 10, wherein the predetermined percentage is approximately 100%.

12. A system for ascertaining the reliability of range estimates available from a passive angle-of-arrival range estimation system in which the transverse bearing spread to an emitter is measured, comprising:

a receiver for receiving signals from said emitter;

at least a pair of spaced-apart collection points along a base leg coupled to said receiver;

a range-determining element including a Kalman filter and coupled to said receiver for calculating a range estimate based on the transverse bearing spread;

a processor for computing the Kalman filter gain, for determining a minimum in the Kalman filter gain, and for ascertaining when, after the Kalman filter gain achieves a minimum, the Kalman filter gain is near zero; and, generating a trigger to signify that the range estimate from said range-determining element is reliable.

13. The system of claim 12, wherein said trigger is generated when after a minimum the Kalman gain is within a predetermined percentage of zero.

14. The system of claim 12, wherein said processor computes Kalman gain in orthogonal directions, said processor determining which of the gains associated with the orthogonal directions is deeper and selecting the gain associated with the deeper minimum as a gain on which to generate said trigger.

15. The system of claim 12, wherein said processor for computing Kalman gain and determining a minimum detects when the Kalman gain achieves a maximum after having achieved a minimum, and further generates said trigger when said Kalman gain approaches zero after said maximum.

16. The system of claim 15, wherein said processor includes an algorithm for ascertaining the existence and time of occurrence of a maximum after a minimum, and inhibits the generation of said trigger until a time after the time associated with the occurrence of said maximum.

17. The system of claim 16, wherein said processor computes Kalman gain in orthogonal directions and determines the deeper minimum of the gains associated with the orthogonal directions; and wherein said trigger generation is dependent upon only gain in the direction which establishes the deeper minimum.

* * * * *